United States Patent

[11] 3,619,350

| [72] | Inventor | Richard Marchfelder |
| | | 159-A Lake Ave., Greenwich, Conn. 06830 |
| [21] | Appl. No. | 840,927 |
| [22] | Filed | July 11, 1969 |
| [45] | Patented | Nov. 9, 1971 |

[54] CHLORINE DIOXIDE PULP BLEACHING SYSTEM
5 Claims, 2 Drawing Figs.

[52] U.S. Cl. .................................................. 162/67, 162/88
[51] Int. Cl. ...................................................... D21c 3/18
[50] Field of Search ........................................... 162/87, 88, 89, 67, 66

[56] References Cited
UNITED STATES PATENTS
2,129,719  9/1938  Vincent........................ 162/67 X

*Primary Examiner*—Howard R. Caine
*Attorney*—Synnestvedt & Lechner

ABSTRACT: A chlorine dioxide bleaching process is disclosed that improves the efficiency of bleaching paper, reduces the consumption of chemicals, water and heat, and minimizes waste disposal problems. The essential feature of the invention is a two-stage system for generating chlorine dioxide in which partially spent chemicals discharged from the primary generation stage are more completely reacted under controlled conditions in a dechlorination stage. Since chlorine dioxide solution from the dechlorinator is somewhat contaminated, it is separately collected for use in the early pulp chlorination stages while the purer chlorine dioxide from the primary generator is reserved for use in the latter stages of pulp bleaching. The chloride content and corrosiveness of the spent reagents are minimized by this process which not only provides for economical utilization of the chemicals but also makes it feasible to add the underflow from the dechlorinator to the black liquor recovery system and so increase the recovery of sulfides. Waste disposal problems and the consumption of water are minimized by recycling free acid from the dechlorinator to the generator and by utilizing the filtrate from the last stages of pulp washing as the absorption media in the chlorine dioxide absorption towers.

CHLORINE DIOXIDE PULP BLEACHING SYSTEM

BACKGROUND OF THE INVENTION

1. Field of the Invention

This invention relates to pulp bleaching processes and, more particularly, to pulp bleaching processes in which chlorine dioxide is used as a bleaching agent. The invention provides for increased efficiency in the generation of chlorine dioxide, improved utilization of the chlorine dioxide in various bleaching stages, improved recovery of spent liquors from the chlorine dioxide generating process, increased utilization of heat, and a reduction in water consumption.

2. Description of the Prior Art

To appreciate the scope of the instant invention it is useful to consider several aspects of the preparation and bleaching of wood pulp as they relate to this invention. These are discussed below.

A. Pulp Bleaching

The bleaching of paper pulp is a continuation of the fiber purification that begins with the pulping process in which the main objectives are to remove residual lignin from the wood pulp fibers and to destroy or solubilize any remaining coloring matter.

The bleaching of wood pulp has been recognized to occur in fairly well defined stages. With respect to those bleaching operations in which chlorine or chlorinated compounds are used, the following stages are recognized:

1. In the first stage there is a significant consumption of chlorine. The primary reaction would seem to be in the chlorination or substitution of the lignin to form compounds that are soluble in alkaline solutions. During this first stage comparatively little oxidation takes place and the wood fibers are not materially attacked nor is their strength materially diminished. A moderate increase in the brightness of the pulp is noted.

2. After the chlorination of the lignin has been substantially HCl c oxidation and solubilization of various coloring matter and residual lignin will take place, causing an increase in the brightness of the pulp. At this point the wood fibers are not materially attacked by the bleaching agent and the strength of the fiber remains substantially unimpaired.

3. In the final stages of bleaching, the brightness increases considerably but, at the same time, a chemical attack upon the fibers begins which, if not properly controlled, will cause a physical degradation and loss of the strength property of the pulp.

In some instances, the above stages of chlorination and bleaching are conducted in a single-stage bleaching operation, such as those utilizing hypochlorites. However, most modern facilities, and those with which this invention is concerned, utilize multistage bleaching. In these multistage bleaching processes it is conventional to treat the pulp with chlorine in a first bleaching stage to solubilize the lignin and then to treat the paper pulp in later bleaching stages to improve whiteness of the fiber. The purifying and bleaching stages are separated usually by an intermediate washing operation with water or an alkaline solution to remove the products of reaction. By removing the impurities gradually in a number of steps, more efficient utilization of the bleaching chemicals is obtained and the chemical attack on the fibers may be reduced to a minimum. This results from the fact that the conditions of reaction within any given stage can carefully be controlled, as, for example, with respect to amount and purity of reactants, temperature, pH, and the like, to optimize obtaining the desired result in such stage.

The various stages of treatment in a multistage bleaching operation usually include a first chlorination stage in which the lignin is solubilized, as mentioned above, either by the addition of chlorine to form chlorinated compounds or by substitution of a chlorine atom for a hydrogen atom. Also, some oxidation may occur. This first stage in bleaching is efficient and inexpensive since it utilizes comparatively low-cost liquid chlorine. Hydrochloric and hypochlorous acids are generated during the chlorination stage and, as a result, the pH of the solution will drop to around 2 during the treatment.

Immediately following the chlorination stage, the solubilized products are removed by means of an alkaline extraction stage. Ordinarily this is accomplished with hot caustic soda at temperatures of about 110° to 160° F. Following the alkali extraction stage, one or more chlorine dioxide stages may be utilized, frequently separated by a washing stage, in which a solution of about 8 to 10 grams per liter of chlorine dioxide gases is brought into contact with the pulp. Various acids are also formed in the chlorine dioxide bleach stages which reduce the pH of the pulp during treatment. It is generally preferable to adjust the pH of the pulp during the alkali extraction stages to about 7.

It is common in describing the above stages in a multistage bleaching operation to use the letter "C" to represent a chlorination stage, the letter "E" to represent an extraction stage, and the letter "D" to represent a chlorine dioxide bleaching stage. Thus, a typical modern five-stage bleaching process can be designated by the sequence C-E-D-E-D.

B. Chlorine Dioxide Generation

A number of processes have been proposed for the generation of chlorine dioxide for use in pulp bleaching. Those that have proved commercially significant are those in which chlorine dioxide is produced by the reduction of sodium chlorate. While any of these processes may be used in the practice of this invention, the more important ones are briefly set forth below.

1. Sulfur Dioxide Processes

Several of the commercially acceptable processes for the production of chlorine dioxide utilize sulfur dioxide in the gaseous form as a reducing agent. Quite generally, their reaction can be categorized as follows:

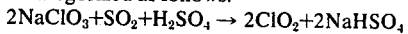
$$2NaClO_3 + SO_2 + H_2SO_4 \rightarrow 2ClO_2 + 2NaHSO_4$$

2. Hydrochloric Acid Process

Hydrochloric acid is sometimes used as a reducing agent, and these processes may be represented by the following formula:

$$2NaClO_3 + 4HCl \rightarrow 2ClO_2 + Cl_2 + 2NaCl + 2H_2O$$

3. Sulfuric Acid Process

Sulfuric acid may be used in combination with sodium chloride to generate chlorine dioxide, and these reactions may proceed as follows:

$$NaClO_3 + NaCl + H_2SO_4 \rightarrow ClO_2 + 1/2Cl_2 + Na_2SO_4 + H_2O$$

and

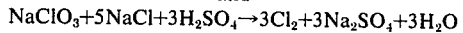
$$NaClO_3 + 5NaCl + 3H_2SO_4 \rightarrow 3Cl_2 + 3Na_2SO_4 + 3H_2O$$

4. Methanol Process

In still another type of process, a combination of sulfuric acid and methanol are used to produce the chlorine dioxide:

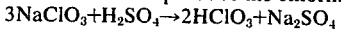
$$3NaClO_3 + H_2SO_4 \rightarrow 2HClO_3 + Na_2SO_4$$

and

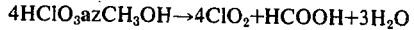
$$4HClO_3 a\dot{z} CH_3OH \rightarrow 4ClO_2 + HCOOH + 3H_2O$$

In any of the above processes, the reagents used to generate the chlorine dioxide are introduced in water solution into a reaction vessel. The reaction generated chlorine dioxide in gaseous form which is withdrawn from an upper region of the generator, collected in an absorption acid tower, and transported to a suitable vessel for storage until needed in the bleaching operation. Chlorine dioxide can be prepared by these methods that is comparatively pure and free from such materials as chlorine, hypochlorous acid, sulfuric acid, sulfur dioxide, and the like.

As mentioned above, the exact method selected for the generation of chlorine dioxide is not important in the practice of the invention, and the above are given as nonlimiting examples of appropriate commercial methods by which chlorine dioxide may be generated.

C. Secondary Recovery of the Chlorine Dioxide

The liquid effluent from the chlorine dioxide reactor, which represents partially spent chemicals in water solution, conventionally is led to a packed stripping column, sometimes by way of an intermediate secondary reactor. The partially spent chemical reagents flow downwardly in countercurrent relationship to an upward flow of air at ambient temperatures which strips residual gases from the partially spent liquor. The gaseous effluent from the packed stripping column conventionally is mixed, at some point in the process, with the chlorine dioxide effluent from the reaction stage.

The recovery of chlorine dioxide from the partially spent liquor in the stripper is of comparatively low yield and of minimal economic importance. Also, dependent upon the process used in the reactor, the effluent gases from the stripper may be contaminated with such materials as hydrogen chloride, sulfuric acid, hypochlorous acid, sulfur dioxide, methanol, and the like. The acid content of these gases is particularly objectionable since it requires increased consumption of alkaline reagents to reduce the acidity to an acceptable level in the various extraction and bleaching stages.

The high salt content of the partially spent liquor from the reactor tends to crystallize on the surface of the packing in the stripper and so cause the down flowing liquor to channel and flow at comparatively high rates through the unblocked portions of the stripper, thus still further diminishing its efficiency. Another disadvantage of this process is that the residual chloride content of the residual liquor after stripping is rather high, which complicates certain chemical recovery as will be discussed more fully below.

D. Spent Liquor Recovery

While not necessary in the practice of this invention, additional advantages accrue when the chlorine dioxide generating process is used in connection with a sulfate or kraft pulping process. In the kraft pulping process, which by far is responsible for the largest production of paper grade pulp, an alkaline solution of sodium hydroxide and sodium sulfide, termed white liquor, is used to remove the lignin binding the cellulose fibers together in the wood. The mixture of wood and liquor is steam heated in a pressure vessel or digester. After completion of the cooking process, the charge is blown into a tank where the steam flashes off and the softened chips disintegrate. The loose fibers are separated and washed free of the spent cooking solution, which is termed the black liquor. The filtrate, containing most of the cooking liquor chemicals and the dissolved portion of the wood, is concentrated by evaporation and fired in a furnace. The dissolved portion of the wood in the black liquor burns, evolving heat to generate steam, leaving a molten residue of soda ash and sodium sulfide. This is dissolved in water to form green liquor, and the green liquor is treated with calcium oxide to convert the sodium carbonate content to sodium hydroxide. The sodium sulfide remains unchanged and the sludge or lime mud is settled out, leaving a clear solution of caustic soda and sodium sulfide, or white liquor, ready for reuse in the digesters. The lime mud or calcium carbonate is burned in a kiln to drive off carbon dioxide, thus regenerating calcium oxide for subsequent use in the treatment of green liquor.

From the above brief description of the kraft pulping process, it can be appreciated that the recovery of sodium sulfide is important in this regenerative process in order to minimize the cost of makeup raw materials.

Referring to the standard reactions listed above utilized in the generation of chlorine dioxide, it can be seen that those reactions represented by equations 1, 2 and 4 all generate either sodium sulfate or sodium hydrogen sulfate. These sulfates usefully can be added to the black liquor to increase the recovery of sodium sulfide from the recovery boiler. However, if the conversion of the reactants to chlorine dioxide is not complete, chlorides, as in the form of sodium chloride, will be present in the spent liquor discharged from either the reaction vessel or the stripping unit and will adversely affect the black liquor recovery furnace. Thus, it can be seen that the loss of chloride from the system not only reduces the efficiency of the chlorine dioxide generation, but also limits the practicality of adding the spent sulfate liquors to the recovery process due to the corrosive effects that the chlorides may have on the boiler tubes. In addition to the expense of tube replacement, corrosion of boiler tubes can result in the danger of serious explosion.

SUMMARY OF THE INVENTION

Accordingly, it is an object of this invention to improve the efficiency of chlorine dioxide pulp bleaching processes.

Another object of this invention is to improve the efficiency of processes for the generation of chlorine dioxide.

Another object of this invention is to provide a multistage pulp chlorination and bleaching process in which the utilization of chlorine dioxide is maximized.

Another object of this invention is to provide a process for the generation of chlorine dioxide wherein the residual salt content of the spent reagents is reduced to a sufficient degree to diminish corrosive damage to recovery boilers and so permit adding the spent reagents to the black liquor for recovery in kraft pulping processes.

Another object of this invention is to reduce the consumption of chemicals, water and heat in multistage pulp bleaching processes while maximizing the whiteness of the bleached pulp.

Briefly, these and other objects of this invention are achieved by generating chlorine dioxide in a primary reactor, removing partially spent reagents from this reactor, continuing the generation of chlorine dioxide in a dechlorinator, and separately collecting and utilizing the gases generated in the reactor and the dechlorinator. To increase the efficiency of the generation of chlorine dioxide in the dechlorinator, the reactants preferably are heated to elevated temperatures, and additional chemicals, other than the basic sodium chlorate, may be added to insure substantially complete reaction of the remaining sodium chlorate. The solution of absorbed gas from the dechlorinator is sent to a chlorine bleaching stage where impurities such as hydrochloric acid, sulfuric acid, sulfur dioxide, etc., can be tolerated. The comparatively pure chlorine dioxide solution generated in the primary reactor is preserved for use in the later stages of the bleaching operation where it is important to use chlorine dioxide of high purity. Due to the fact that the generation of chlorine dioxide is maximized in the dechlorinator, only comparatively small quantities of chloride-containing salts are discharged with the spent liquor from the dechlorinator, thus minimizing its corrosive content and making it practical to mix the spent liquor with the black liquor from a kraft pulping process so that the recovery of sodium sulfide may be maximized.

In addition to the foregoing, the preferred method of this invention contemplates the use of heat exchangers to recover heat from the chlorine dioxide effluent from the last stages of washing in the bleaching reactor. After the chlorine dioxide effluent has been cooled and screened, it may be used as the absorption liquid in the chlorine dioxide absorption towers. This avoids loss of residual chlorine dioxide from the system and reduces the consumption of water to a minimum.

DESCRIPTION OF THE DRAWINGS

The invention can be understood in connection with the accompanying drawings in which.

Figure 2:
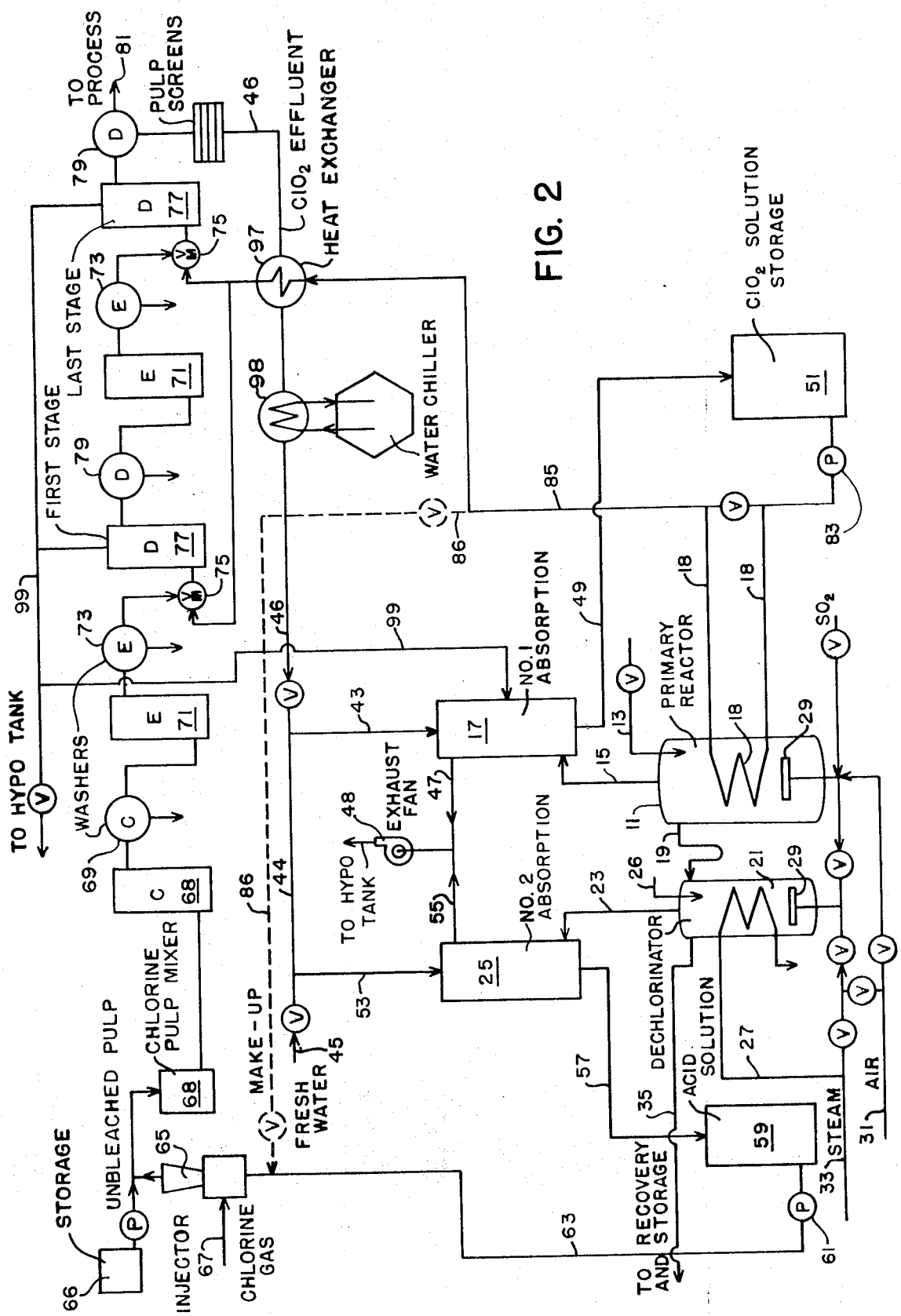
FIG. 2 is a diagrammatic representation illustrating the preferred system of this invention.

Referring to the schematic drawing, in FIG. 2 there is shown a primary chlorine dioxide reactor 11 having conduit feed means 13 for introducing reagents. Gaseous materials are withdrawn from the upper portion of reactor 11 as by conduit 15 from whence they are led to a primary chlorine dioxide absorption tower 17.

Preferably, the reactor 11 is provided with temperature control means such as internal heat exchange coils 18. Partially spent reagents are overflowed from the primary reactor 11 via a conduit 19 and introduced into a dechlorinator 21. Gaseous reactants are withdrawn from the dechlorinator 21 by means of a conduit 23 and directed to a secondary chlorine dioxide absorption tower 25. A feed conduit 26 is provided to permit the addition of reagents to the dechlorinator 21. The dechlorinator 21 preferably includes heat exchange means such as a series of hot water or steam coils 27. A gas diffuser or sparger tube 29 is located near the bottom of the dechlorinator 21 and is provided with a source of air 31, steam 33, or a mixture of air and sulfur dioxide.

An underflow conduit 35 is provided to conduct the spent liquor from the dechlorinator to the black liquor recovery system (not shown).

The primary absorption tower 17 is provided with a supply of absorption wash water via a conduit 43. Conduit 43 receives absorption water from conduit 44 which, in turn, is supplied either by water line 45 or by the effluent return line 46. An exhaust conduit 47 which is in communication with an exhaust fan 48 is used to vent gases from the top of the absorption tower 17 to a neutralization tower or tank. The underflow from the primary absorption tower 17 communicates via a conduit 49 to the primary chlorine dioxide storage vessel 51.

In a similar manner, the secondary absorption tower 25 is provided with a source of absorption wash water 53 and an exhaust conduit 55 that communicates with the exhaust fan 48. Underflow from the secondary absorption tower is led via a conduit 57 to a contaminated chlorine dioxide storage vessel 59. The contaminated chlorine dioxide storage vessel 59 communicates via a pump 61 and conduit 63 to a mixing chamber 65 that is also provided with makeup feeds of paper pulp 66 and chlorine gas 67. Provision is made to pump the ingredients from the mixer 65 to a chlorination vessel 68. The pulp is advanced during bleaching sequentially to a chlorination washer 69, a caustic extraction treatment vessel 71, to one or more caustic washers 73, mixing chambers 75, and chlorine dioxide treatment towers 77. The treatment of the pulp is completed in a chlorine dioxide washer 79 and collected in a stock storage vessel 81.

A pump 83 and conduit 85 are provided to enable communication between the primary chlorine dioxide storage vessel and the chlorine dioxide mixing vessel 75. A valved conduit 86 communicates between conduit 85 and conduit 63.

In operation, the various reagent materials, depending upon the system used for generating chlorine dioxide, are introduced into the primary chlorine dioxide reactor 11. The gaseous effluent is conducted via the conduit 15 to the primary absorption tower 17. The chlorine dioxide gases are absorbed by the supply of water 43 and led via a conduit 49 to a vessel 51 where the chlorine dioxide is stored until needed. This chlorine dioxide is comparatively pure and contains a minimum quantity of contaminates such as chlorine, hypochloric acid, sulfuric acid, and the like. This material is reserved and maintained separate and apart from the chlorine dioxide generated in the dechlorinator. By this means, comparatively pure chlorine dioxide is available for introduction into the mixer of the chlorine dioxide bleaching stages as at 75 to obtain maximum effectiveness in bleaching the pulp.

The chlorine dioxide generated in the dechlorinator 21 is absorbed in a separate absorption tower 25 and collected in a contaminated chlorine dioxide storage vessel 59. This material may be contaminated by a number of ingredients, depending upon the chlorine dioxide generating system used, and, due to the presence of these contaminates, it is not used in the chlorine dioxide stages of the pulp bleaching. Rather the contaminated chlorine dioxide is utilized ahead of the first bleaching stage 77. Preferably, the contaminated chlorine dioxide is mixed with chlorine at an injection station 65 to disperse the chlorine in the solution before injection into the pulp to improve the efficiency of the bleaching. Also, the mixture can be fortified, if desired, with chlorine dioxide from the primary storage vessel 51 by means of valved conduit 86.

Due to the fact that the chlorination stage is conducted under acidic conditions and due to the fact that the purpose of the chlorination stage is primarily to solubilize the lignins rather than to bleach the various coloring material, the impurities in the chlorine dioxide do not materially affect the efficiency of this operation even though they would have an adverse effect upon the whiteness of the pulp if used in the final stages of bleaching as in vessel 77. The impurities also would increase the consumption of alkali in the bleaching stages since the pH should be maintained at about 4 or more in the latter stages of bleaching to avoid excessive degradation of the paper pulp and to remove certain contaminating materials, such as ferrous ions, that are soluble at higher pH's.

To increase the efficiency of the generation of chlorine dioxide in the dechlorinator, it has been found advantageous to heat the partially spent liquors. Thus, heating elements 27 are positioned in heat exchange relationship with the secondary reactor in order that the temperature of the liquors preferably may be raised to about about 250° F. or, more preferably still, to above about 300° F. The partially spent liquors in the dechlorinator 21 can also be heated by introducing steam via line 33 to the sparging tube 29.

Figure 1:
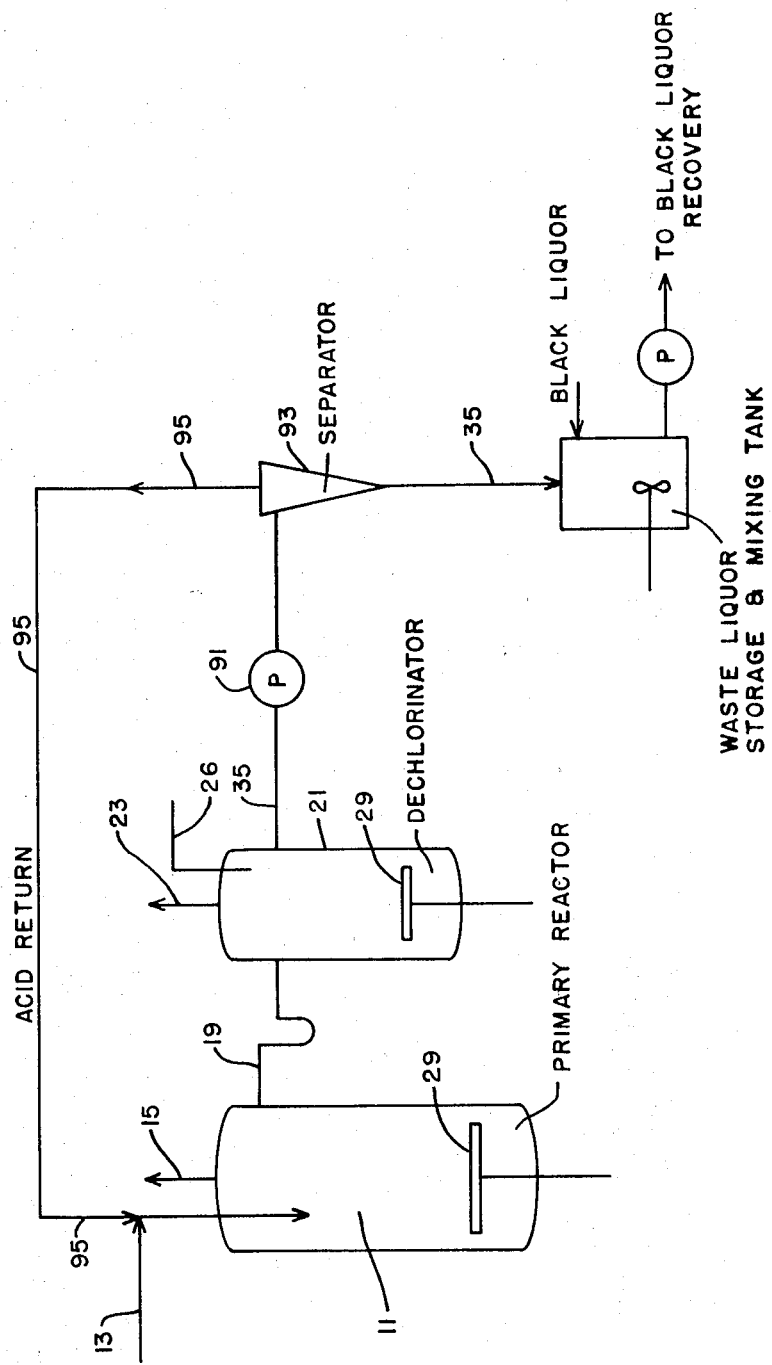
FIG. 1 is a diagrammatic representation of a method in accordance with this invention by which free acid from the underflow of the dechlorinator is recycled to, and utilized in, the primary reactor.

Referring now to FIG. 1, there is shown an interesting variation in the process of this invention that provides for greater operational economies and a reduction in waste liquors that require treatment before discharge from the system. As shown in FIG. 1, the underflow leaves a dechlorinator 21 by way of conduit 35 and its velocity is increased by a pump 91. The underflow discharged from the pump 91 is directed to a liquid-semisolid or -solid separation device 93. The separation device 93 is here illustrated schematically as being a hydrocyclone, although other appropriate equipment such as rotary drum filters or centrifugal devices could be used to equal advantage. The underflow from the hydrocyclone 93, containing the denser residues, is directed to the black liquor recovery system while the overflow containing the less dense liquid component having a high percentage of sulfuric acid is recycled via conduit 95 and mixed with the makeup feed entering the primary reactor through conduit 13.

As discussed above, it is advantageous to operate the dechlorinator at elevated temperatures. In addition to the advantages previously referred to, high temperature operation of the dechlorinator will cause the liquid components to be partially evaporated within the dechlorinator which will result in the removal of water as well as the precipitation of the less soluble salts. If desired, the underflow in conduit 35 may be cooled by a heat exchange device prior to a treatment of the underflow in the hydrocyclone or other separator. By this means, the precipitation of residual salts will be increased and the underflow from the hydrocyclone 93 can be directed to storage for later use in the black liquor recovery process. On the other hand, the overflow from the hydrocyclone 93 will be essentially freed from salts and will contain unreacted free acid. By recycling the acid to the reactor, the requirements for makeup feed acid are materially reduced as also will be the disposal problems.

The system illustrated in FIG. 1 is also advantageous in that it enables the use of greater than stoichiometric amounts of acid, at least within the dechlorinator, to insure substantially complete conversion of the chlorine-containing salts into gaseous chlorine-containing products. Even though excessive quantities of acid are used, the efficiency of the acid utilization is not diminished since the excess free acid is returned from the hydrocyclone to the primary reactor.

Referring again to FIG. 2, it can be seen that the system of this invention provides for even additional economies. For example, the effluent from the chlorine dioxide stage is utilized as the absorption medium in the absorption towers to use the residual chlorine dioxide from the system and to reduce the requirement for makeup feed water.

As shown in FIG. 2, a heat exchanger 18 is provided in heat exchange relationship with the primary reactor 11. The coils 18 are illustrated as being located within the primary reactor, although an external heat exchanger could be used. Due to the heat generated by the addition of sulfuric acid and other chemicals to the primary reactor 11, it is generally necessary to remove heat from the primary reactor to maintain the temperature at a suitable level. On the other hand, to achieve efficient absorption and storage of the chlorine dioxide in water solution, the primary absorption column 17 and the primary storage vessel 51 should be maintained at temperatures of about 45-50° F. In the bleach tower 77, however, most efficient operation is obtained if the temperature is above 160° F., and, therefore, it is desirable to heat the chlorine dioxide solution leaving the storage vessel 51 to an elevated temperature prior to introducing the solution into the bleach tower 77. Thus, to achieve an economical heat balance, the chlorine dioxide solution is withdrawn from the primary storage vessel 51 and passed through heat exchanger 18 via conduits 96-96. By this means, heat is withdrawn from the primary reactor and is used to heat the feed of chlorine dioxide to the bleach tower 77.

The effluent or filtrate leaving the final stage washer 79 is essentially at a temperature slightly lower than maintained within the bleach tower 77. This filtrate is led via conduit 46 through heat exchanger 97 where the temperature of the incoming chlorine dioxide solution is still further increased and the washer effluent is colled.

A second heat exchanger 98 is also provided in conduit 46 to cool the effluent from the bleach tower 77 to below about 50° F. The cooling coils within the heat exchanger 98 continuously circulate a supply of cold water from a water chiller unit. The recirculating water, in turn, may be cooled by the outdoor ambient temperature in the wintertime or by refrigeration equipment in the summertime.

As mentioned above, dissolution of the gaseous chlorine dioxide in an aqueous solution occurs most efficiently at temperatures below about 50° F., and preferably at about 45° F. Since the effluent chlorine dioxide solution flowing through conduit 46 is reduced to this temperature by the combined actions of heat exchangers 97 and 98, the chlorine dioxide effluent from the last chlorine dioxide washer may be utilized as the absorption medium. This is accomplished by returning the effluent through conduits 46, 44, 43 and 53 into both the reactor and the dechlorinator. This provides a most efficient system since little or no additional feed water need be added to the absorption system and since any unreacted chlorine dioxide from the final bleaching stage is recycled to the absorption towers.

From the above description, it can be appreciated that this system of heat exchangers provides for maximum utilization of heat and, more importantly, it enables recovery of the residual chlorine dioxide from the system, it reduces water consumption in the system, and it minimizes the use of waste treatment equipment needed to treat noxious materials discharged from the system.

From the foregoing, it can be appreciated that the increased efficiencies attained by using a dechlorinator 21 are at least twofold. First, the use of a dechlorinator increases the yield of chlorine dioxide, and second, it reduces the amount of chloride salts that are discharged with the spent liquor as via conduit 35. By reducing the chloride content in the underflow liquor, the liquor may be added to the black liquor for introduction into a recovery furnace and so increase the yield of sulfides from the recovery system.

The conversion within the dechlorinator can be conducted more completely if additional chemicals are added via conduit 26 to the dechlorinator. Such addition to the dechlorinator 21 will increase the yield of chlorine dioxide and diminish the chloride content of the underflow by a proportional amount. The amount and kind of chemicals that are added depend upon the chemical system that is used to generate chlorine dioxide in the first stage. For example, if sulfur dioxide is used as the reducing agent as illustrated by equation (1) above, additional quantities of sulfur dioxide may be added as by sparging tube 29.

Still further, additional benefits accrue through the practice of this invention in that the amount of contaminated effluent that must be treated is minimized. This is accomplished by recycling acid from the dechlorinator to the primary reactor for reuse and by recycling the chlorine dioxide effluent to the absorption columns. The system also provides for maximum utilization of acid, chlorine dioxide and water. Lastly, by providing for heat exchangers in the system, the thermal requirements of the bleaching process can be substantially reduced.

I claim:
1. A method for bleaching paper pulp in which the pulp is first treated in a chlorination stage and subsequently is treated in a bleaching stage, including the steps of:
   generating chlorine dioxide gas in a first reaction stage by reducing the sodium chlorate with a solution containing a reducing agent;
   collecting the gaseous products of reduction from the first reaction stage, absorbing the gases in water, and contacting paper pulp in the bleaching stage with the water containing the absorbed gases;
   withdrawing the liquid reactant products from the first reaction stage, introducing them into a second reaction stage, and heating these liquid reactants to increase their chemical reactivity; and
   collecting the gaseous products of the second reaction stage, absorbing the gases in water, and contacting paper pulp in the chlorination stage with the absorbed gases from the second reaction stage.

2. A method according to claim 1 wherein the sodium chlorate is reduced by a solution of sulfuric acid and sulfur dioxide.

3. A method according to claim 1 wherein the liquid reactant products from the second reaction stage are separated into a high-salt-containing component and a free-acid-containing component and the free-acid-containing component is recycled to the first reaction stage.

4. A method according to claim 3 wherein the high-salt-containing component is sent to a black liquor recovery system.

5. A method according to claim 2 wherein sulfur dioxide is introduced into the second reaction stage.

* * * * *

UNITED STATES PATENT OFFICE
CERTIFICATE OF CORRECTION

Patent No. 3,619,350           Dated November 9, 1971

Inventor(s) Richard Marchfelder

It is certified that error appears in the above-identified patent and that said Letters Patent are hereby corrected as shown below:

| | |
|---|---|
| Column 1, line 30 | Delete "in". |
| Column 1, line 38 | Delete "HCl c " and insert "completed,". |
| Column 2, line 54 | In the formula, delete "az" and insert "+". |
| Column 2, line 57 | "Generated" should be "generates" |
| Column 6, line 13 | Delete "about" at its second occurrence. |
| Column 7, line 19 | "Colled" should be "cooled". |

Signed and sealed this 23rd day of May 1972.

(SEAL)
Attest:

EDWARD M. FLETCHER, JR.            ROBERT GOTTSCHALK
Attesting Officer                  Commissioner of Patents